Nov. 18, 1947.  J. A. WOODS  2,431,101
APPARATUS FOR FABRICATING PIPE UNITS AND THE LIKE
Filed Sept. 29, 1942  3 Sheets-Sheet 1
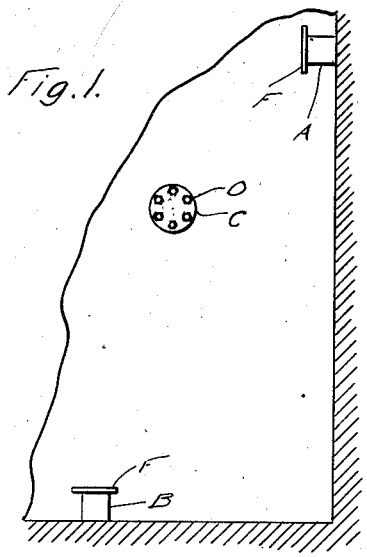
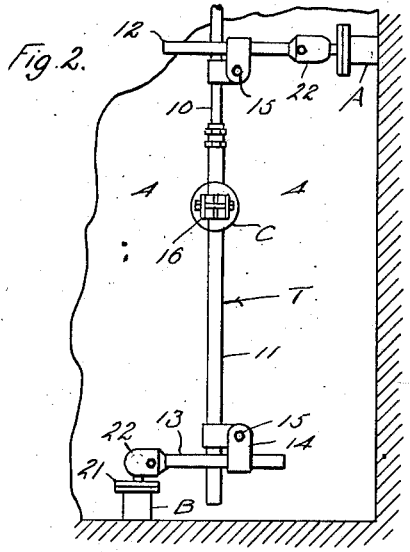
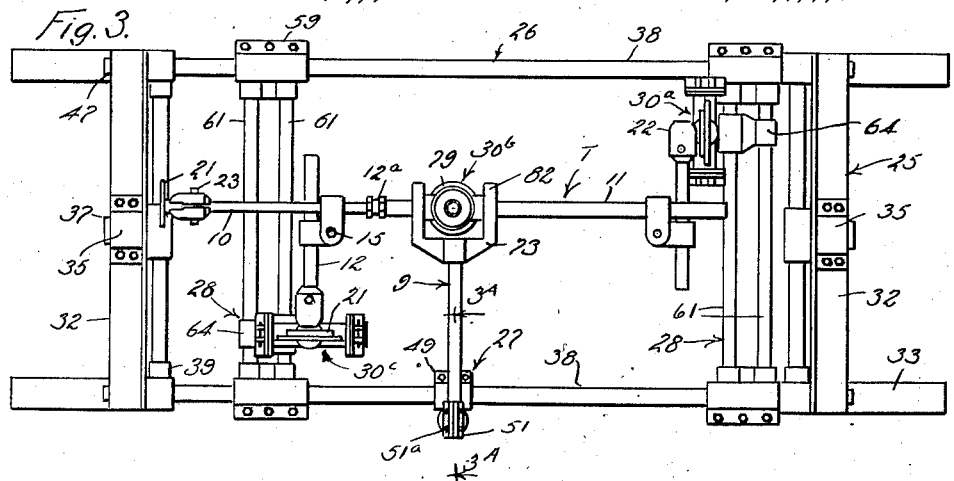
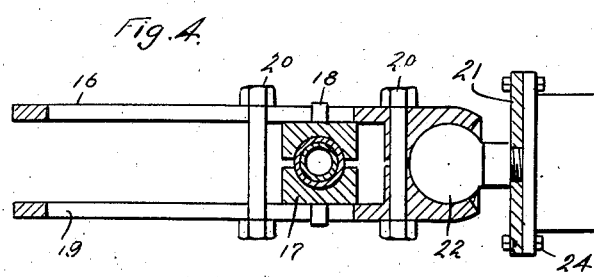
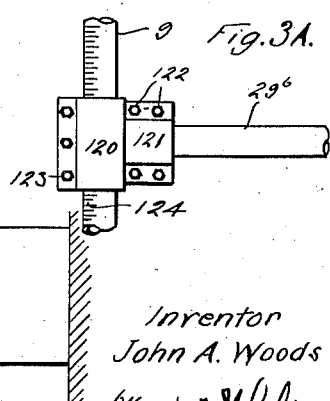
Inventor
John A. Woods
by [signature]
Attorney Nov. 18, 1947.   J. A. WOODS   2,431,101
APPARATUS FOR FABRICATING PIPE UNITS AND THE LIKE
Filed Sept. 29, 1942   3 Sheets-Sheet 2
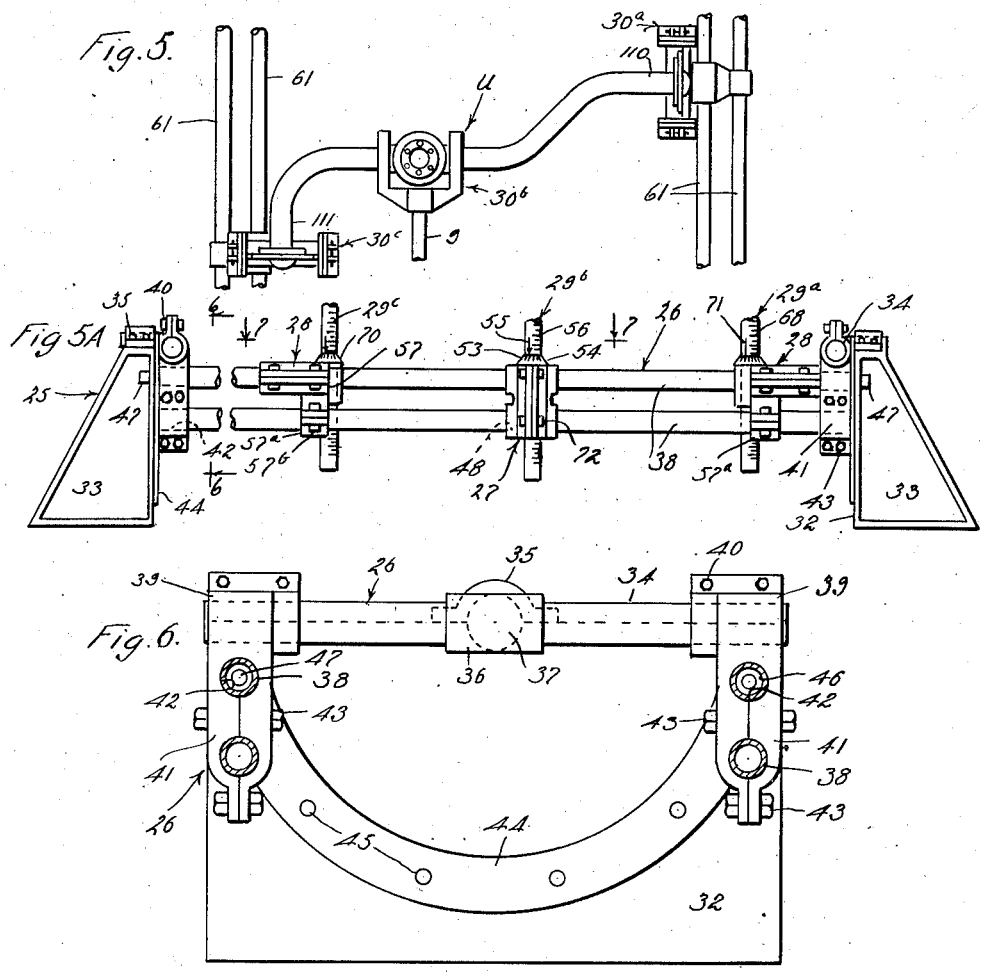
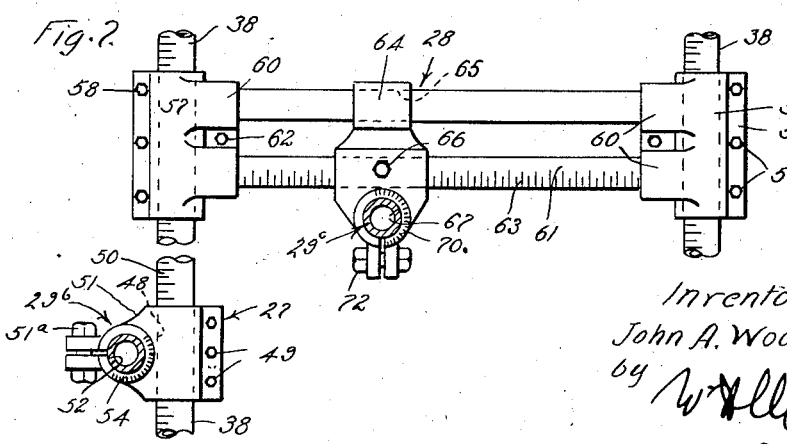
Inventor
John A. Woods
by W. H. Catwell
Attorney Nov. 18, 1947.  J. A. WOODS  2,431,101
APPARATUS FOR FABRICATING PIPE UNITS AND THE LIKE
Filed Sept. 29, 1942  3 Sheets-Sheet 3
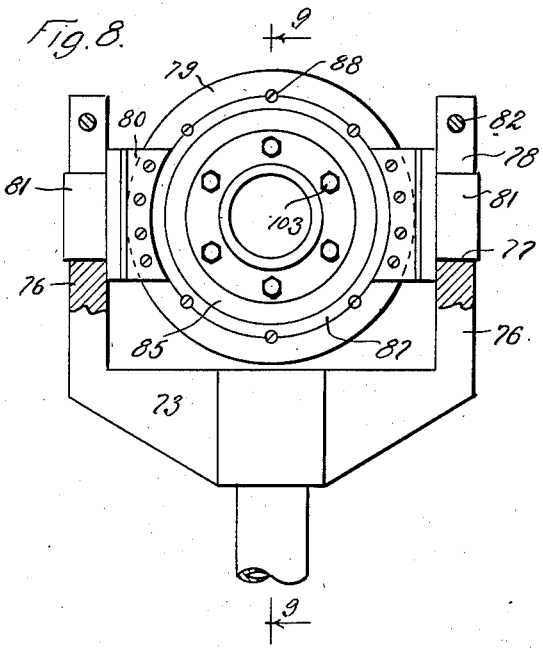
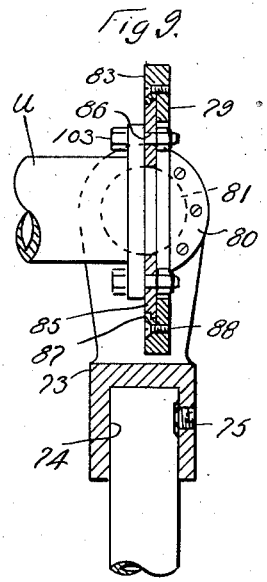
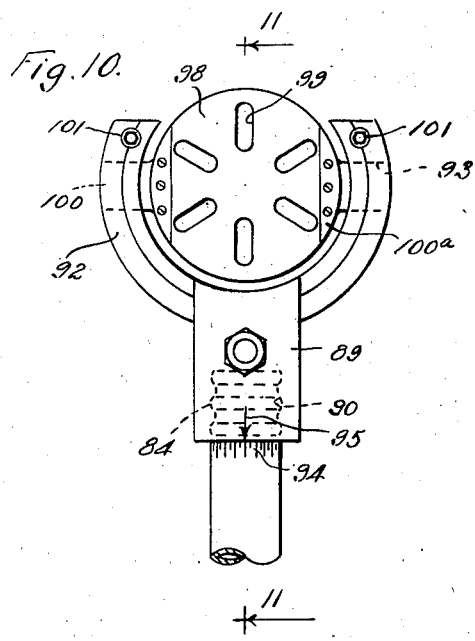
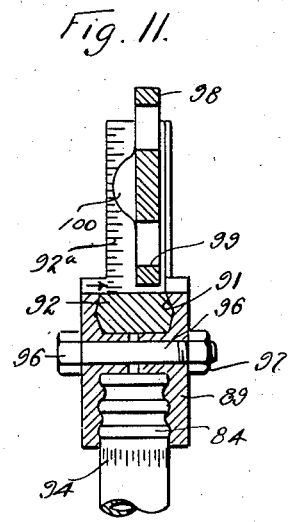
Inventor
John A. Woods
by W. Hllapwell
Attorney Patented Nov. 18, 1947

2,431,101

UNITED STATES PATENT OFFICE 2,431,101

APPARATUS FOR FABRICATING PIPE UNITS AND THE LIKE

John A. Woods, Wilmington, Calif.

Application September 29, 1942, Serial No. 460,116

6 Claims. (Cl. 29—288)

This invention relates to the fabrication of assembled units and relates more particularly to apparatus for facilitating the assembling or fabrication of welded-together parts or structures such as piping units.

In many situations it is necessary to construct a part or unit to fit between or connect with fixed or previously installed elements. For example, in ship building it is often necessary to fabricate piping units to connect with previously installed fixed pipe parts. Such piping units are sometimes made to specifications and when so constructed it is not infrequent to find that they will not fit in the intended locations due to an error in the installation of the previously installed parts which cannot be readily moved or changed. Furthermore, even when measurements are made at the point of intended installation and the piping unit is made in accordance with such measurements it frequently occurs a unit will not fit when completed due to errors in the measurements or to slight inaccuracies in the fabrication of the unit.

In fabricating welded-together piping units of any appreciable complexity it is extremely difficult to complete the unit without some slight error developing and such errors are often difficult to correct or remedy. The workmen usually spend a great deal of time in attempting to assemble or weld up the unit in accordance with the measurements taken at the point of installation or according to the specifications but owing to the difficulty of supporting the several pieces of work during the assembling operations such efforts are often to no avail and even though the finished unit is apparently accurately constructed according to the measurements of specifications there is no assurance that it will fit in the intended place of installation.

Another object of this invention is to provide a simple, practical and improved supporting device or fabricator to facilitate the assembling of fabricated units, such as welded-together piping assemblies.

Another object of this invention is to provide a supporting frame or fabricator embodying a multiplicity of face plates or supports adapted to firmly and dependably mount the flanges or end parts of the piping unit.

Another object of this invention is to provide a supporting frame or fabricator of the character referred to whose several work supporting heads or face plates may be easily and quickly adjusted in a vertical direction, in a horizontal direction and about intersecting axes to assume practically any position as conditions may require.

Another object of this invention is to provide a fabricator of the character mentioned in which the entire work supporting frame may be tilted or adjusted to give ready access to the work.

A further object of this invention is to provide a strong, rigid and unyielding work supporting frame or fabricator of the character referred to in which the work supporting parts cannot play, shift or become displaced during use.

The various objects and features of my invention will be fully understood from the following detailed description of typical preferred forms and applications of my invention, throughout which description reference is made to the accompanying drawings, in which:

Fig. 1 is a fragmentary diagrammatic view of a typical place of installation for a pipe assembly or unit. Fig. 2 is a view similar to Fig. 1 showing the templet in position after adjustment to the pipe parts. Fig. 3 is a plan view of the fabricator of the invention with its work engaging parts or face plates adjusted to the templet. Fig. 3ª is a fragmentary elevation view taken as indicated by line 3ª—3ª on Fig. 3. Fig. 4 is an enlarged horizontal detailed sectional view of the templet secured to a fixed part at the point of installation, being a view taken as indicated by line 4—4 on Fig. 2. Fig. 5 is a fragmentary plan view illustrating a work unit engaged in the fabricator. Fig. 5ª is a fragmentary side elevation of the fabricator. Fig. 6 is a vertical detailed sectional view taken as indicated by line 6—6 on Fig. 5ª illustrating one end of the fabricator. Fig. 7 is a fragmentary horizontal detailed sectional view taken as indicated by line 7—7 on Fig. 5ª. Fig. 8 is an enlarged side elevation of one of the work supporting heads carrying a flanged pipe part with certain parts broken away. Fig. 9 is a vertical detailed sectional view taken as indicated by line 9—9 on Fig. 8. Fig. 10 is an enlarged side elevation of another form of head or work supporting means and Fig. 11 is a vertical detailed sectional view taken as indicated by line 11—11 on Fig. 10.

The apparatus of the invention may be employed in connection with the assembling of devices, units and assemblies of various kinds and the apparatus may be modified to adapt it for any given field of use. In the drawings I have shown the apparatus as employed to facilitate the assembling or fabrication of a welded-together pipe unit U intended to fit a given installation. It is to be understood that this is merely illustrative and is not to be taken as limiting or restricting the range of application of the invention.

The templet T is fully described and claimed in my co-pending application Serial No. 460,115, filed September 29, 1942, and a division thereof, Serial No. 669,950, filed May 15, 1946, and need not be described in great detail here. The templet T is designed to be arranged at the point of installation of the unit U to be fabricated and has parts adapted to be positioned on the fixed or previously installed parts of the piping system. The templet T is adjustable so that these parts may be set in the exact relationship to be assumed by the end parts or flanges of the completed pipe unit.

The templet T comprises an elongate body made up of telescopically related sections 10 and 11 so that it may be extended or shortened and is adapted to be secured or set in the adjusted condition by a nut 12ª. The templet further includes two similar branches 12 and 13 connected with the templet body by pairs of pivotally connected collars 14. One collar 14 of each pair is rotatively and longitudinally adjustable on a body section 10 or 11 and the other collar 14 carries its branch 12 or 13 for rotative and longitudinal adjustment. The collars 14 are set in their selected adjusted positions by tightening their pivot bolts 15.

The templet is further provided with a third branch part 16. The branch part 16 is elongate and U-shaped and straddles a pair of blocks 17 engaged on a body section 10 or 11. The blocks 17 have pins 18 slidable in elongate slots 19 in the branch part 16. With this construction the branch part 16 is bodily shiftable transversely with respect to the body of the templet and may be pivoted on the pins 18 and turned on the templet body as required. Bolts 20 are employed to lock or clamp the branch part 16 in the adjusted position. Each branch 12 and 13 and the branch part 16 carries, what I will term, a flange 21. The flanges 21 are connected with their respective branches and branch parts by ball and socket connections 22 which allow them to be turned, tilted in all directions and then set in the adjusted positions. The ball and socket connections 22 of the branches 12 and 13 are adapted to be locked by bolts 23 while one of the bolts 20 of the branch part 16 may serve to clamp its flange 21 in the adjusted position.

The particular place of installation illustrated in Figs. 1 and 2 of the drawings has three pipe parts A, B and C projecting from three different walls. The pipe parts A, B and C occur at different vertical planes and are at different elevations. The fixed pipe parts are provided with flanges F having series of spaced openings O. While I have shown the flanges F disposed in vertical and horizontal planes it is apparent that in some installations the flanges may be inclined or tipped.

The templet T is brought to the intended place of installation of the piping unit U, that is to be fabricated, and is adjusted so that its flanges 21 flatly cooperate with the flanges F of the pipe parts A, B and C and are in concentric relation thereto. The flanges 21 of the templet T each have two or more openings positioned to register with openings O of the flanges F and the templet flanges 21 are turned to align their openings with the openings of the flanges F. It is believed that it will be apparent how the templet T may be adjusted so that its several flanges 21 are properly mated with the flanges F and when this has been done the flanges 21 may be temporarily bolted to the flanges F by bolts 24, as in Fig. 4. The branches 12 and 13 and the branch parts 16 are then locked or set in their adjusted positions and the flanges 21 are likewise fixed against movement. When this has been done the templet T is disconnected from the flanges F and is removed and taken to the fabricator, to be later described, and which is adjustable to receive the templet. It will be observed that the templet T forms an exact model or pattern for setting the fabricator so that it will hold the end parts of the proposed pipe assembly or unit in the correct positions.

The work supporting device or fabricator of the present invention is adapted to be adjusted and set in accordance with the templet T, that is, so that its work supporting parts are engaged by and support the several flanges 21 of the templet T and upon removal of the templet from the fabricator the fabricator is adapted to support the several elements of the work or piping unit U as the same is assembled so that its end parts will be in the correct relation for connection with the flanges F of the pipe parts A, B and C. It is to be understood that the fabricator may be adjusted and set in accordance with specifications or measurements.

The work supporting device or fabricator of the present invention comprises a supporting means or base 25, a frame 26 carried by the base 25 for bodily pivotal adjustment, one or more carriages 27 shiftable longitudinally along the frame 26, one or more carriages 28 shiftable transversely of the frame 26, posts 29ª, 29ᵇ and 29ᶜ adjustably supported by the carriages 27 and 28, horizontal arms 9 on one or more of the posts and adjustable means 30ª, 30ᵇ and 30ᶜ on the posts and arms for receiving and holding parts of the work.

The support or base for the fabricator may vary greatly in character depending upon the size of the device, its place of installation, etc. In the case illustrated, the base 25 comprises two horizontally spaced ends 32. The ends 32 are upright structures braced at their outer sides by flanged triangular webs 33. The base flanges of the ends 32 may be secured to the floor by bolts, lag screws, or the like, or in some cases the base flanges of the ends 32 may be fixed to beams or the like.

The frame 26 supports the several carriages 27 and 28 for movement or adjustment. In accordance with the invention the frame 26 is constructed so that it cannot yield, rack or bind. The frame 26 is an elongate rectangular structure arranged between the base ends 32. While the frame 26 may be constructed of any selected material or stock I prefer to construct it of pipe to obtain the maximum strength with the minimum weight. The stock or pipe employed is of such size and character that it dependably resists distortion and flexure. The frame 26 includes end members 34 at each end of the structure. The end members 34 lie in planes at the inner sides of the base ends 32 adjacent the tops of the base ends. The end members 34 of the frame are supported on the base ends 32 by bearing means. In the construction illustrated a bearing 35 is bolted or otherwise fixed on the upper face of each base end 32. A collar 36 is clamped or fixed on each end member 34 at a point intermediate its ends and each collar 36 carries a projecting shaft or trunnion 37. The trunnions 37 are turnably received in the bearings 35. With the structure just described the frame 26 is supported for pivotal movement or swinging about a horizontal axis extending longitudinally of the fabricator.

The frame 26 further includes longitudinal elements or sides extending between and connecting the end members 34. In the preferred construction each side of the frame 26 is made up of two vertically spaced parallel members 38. These side members 38 are rigidly connected with the end members 34. Corner fittings serve to connect the end members 34 and side members 38. As best illustrated in Figs. 5 and 6 of the drawings each corner fitting comprises a split collar 39 engaged on an end portion of an end member 34. The collars 39 are fixed or clamped on the end members 34 by bolts 40 passing through their split flanged portions. The collars 39 carry downwardly projecting parts or lugs 41. The lugs 41 are split longitudinally or vertically and each lug has vertically spaced openings 42 for receiving the end parts of the side frame members 38. The splits of the lugs 41 intersect the openings 42. Clamp screws or bolts 43 are passed through transverse openings in the split lugs 41 and are operable to clamp the side members 38 in the lugs. With the construction just described the end and side members 34 and 38 are rigidly and securely connected to form a strong rectangular frame. It will be observed that the side members 38 are spaced one above the other in vertical planes.

The invention includes means for holding the frame 26 against movement or swinging in any one of a plurality of different positions. This means includes a segment or an arcuate strip 44 secured to each base end 32. The ends 32 may be cut away above their arcuate strips 44. The strips 44 are curved concentric with the axis of pivotal movement of the frame 26. A plurality of spaced openings 45 is provided in each strip 44 and the openings of the two strips are horizontally aligned. Bushings 46 are fixed in the ends of the uppermost side members 38 of the frame, see Fig. 6. The parts are related so that the bushings 46 move across the openings 45 when the frame is tilted. Pins 47 are passed inwardly through the openings 45 to engage in the bushings 46 to hold the frame 26 in the selected adjusted position. In the case illustrated in the drawings the frame 26 is held in the horizontal position by the engagement of the pins 47 in the openings 45 and the bushings 46, it being understood that the frame may be tilted to any selected position or brought to a vertical position to facilitate access to the work.

The carriages 27 and 28 are adjustable on the frame 26 to support the vertically adjustable posts 29$^a$, 29$^b$ and 29$^c$ and their arms 9 which in turn support the work holding means 30$^a$, 30$^b$ and 30$^c$. The carriages 27 are movable along the frame 26 being carried by the side members 38. There may be one, two or more carriages 27 on each side of the frame 26. In the case illustrated, there is one carriage 27 on one side of the frame 26. The carriage 27 is provided with vertically spaced horizontal openings 48 slidably receiving the two side members 38 at one side of the frame 26. The engagement of the two side members 38 in the spaced openings 48 positively prevents lateral movement, turning and tipping of the carriage 27. The side members 38 preferably accurately fit the openings 48 so that there can be no play or vibrating of the carriage 27. Means is provided to secure or hold the carriage 27 in the adjusted position on the frame 26. This releasable holding means may be varied without departing from the invention. In the particular case illustrated, the carriage 27 is split horizontally at each opening 48 and clamp bolts 49 pass through openings in flanges at the splits to clamp the carriage onto the frame members 38. The uppermost side members 38 are preferably calibrated by providing them with calibrations 50 of length. The calibrations 50 are read in conjunction with the sides or ends of the carriage 27 to determine the position of the carriage 27 on the frame 26.

The carriage 27 has a laterally or outwardly projecting portion 51. A vertical opening 52 passes through this portion 51 and slidably receives the post 29$^b$. It will be observed that the carriage 27 is of substantial vertical extent and the opening 52 is of substantial length to prevent rocking or tilting of the past 29$^b$ and to hold the post truly vertical. The post 29$^b$ may be rotatable in the opening 52 to facilitate the positioning of its work carrying means 30$^b$. The part 51 of the carriage 27 is vertically split and flanged and clamp bolts 51$^a$ are engaged in openings in its flanges so that the post 29$^b$ may be secured or clamped in any selected position.

Where the post 29$^b$ is rotatable in the opening 52 it is preferred to provide means to accurately determine the rotative setting of the post. This means may comprise a raised part 53 on the carriage 27 surrounding its opening 52 and calibrations 54 on the raised part. A longitudinal marker 55 is provided on the post 29$^b$ and the position of the marker with respect to the scale or calibrations 54 indicates the rotative position of the post 29$^b$. The calibrations 54 may be in the nature of a vernier scale. Furthermore, the post 29$^b$ is preferably provided with longitudinal calibrations 56 which may be read with any relatively fixed part to indicate the vertical adjustment of the post. For example, the calibrations 56 may be read in connection with the upper end of the raised part 53. It will be observed that the slide or carriage 27 is a simple inexpensive member easily adjusted and set and that it carries the post 29$^b$ for ready vertical adjustment and turning.

The carriages 28 are movable longitudinally of the frame 26 and support their respective posts 29$^a$ and 29$^c$ for bodily adjustment transversely of the frame so that the posts are carried for adjustment both longitudinally and transversely of the frame. There may be one, two or more carriages 28. In the case illustrated there are two carriages 28 of identical or like construction. Each carriage 28 includes a slide 57 slidable or shiftable along each of the uppermost side members 38 of the frame 26. The slides 57 are elongate to have extensive bearing on the members 38. Means are provided for securing or holding the slides 57 in the adjusted positions on the members 38. In the particular construction illustrated the slides 57 are longitudinally split at their outer sides and clamp bolts 58 pass through openings in flanges 59 at the splits to clamp the slides onto the frame members 38. The slides 57 have depending parts provided with split and flanged portions 57$^a$ which slidably engage on the lower frame members 38 to steady and guide the slides. Clamp bolts 57$^b$ pass through openings in the flanged portions 57$^a$ to clamp them onto the lower frame members 38.

The inner side of each slide 57 has two horizontal hollow bosses 60. The bosses 60 of the two slides 57 are aligned and their openings or sockets receive the end parts of horizontal carriage members 61. The carriage members 61 may be formed of pipe, or the like, and in practice may be of the same stock as the frame members 34 and 38. The carriage members 61 may be secured in their bosses 60 by set screws or clamp screws 62. The carriage members 61 extend at right angles to the side members 38 of the frame 26 and preferably lie in the same horizontal plane as the upper side members 38. The pair of members 61 of each carriage 28 are spaced apart horizontally. One or both of the members 61 is provided with calibrations 63.

Each carriage 28 further includes a slide 64 for carrying its respective post 29ª or 29ᶜ. The slides 64 of the carriages 28 have spaced openings 65 shiftably or slidably receiving the members 61. The engagement of the slides 64 on the pairs of members 61 is such that the slides may be freely moved back and forth on the carriage members but cannot rock, tilt, or shift laterally. Suitable means are provided for securing the slides 64 against movement following their adjustment to the desired positions. These means may comprise set screws or clamp screws 66 on the slides for cooperating with the members 61. The end faces of the slides 64 may be read with the calibrations 63 to ascertain the exact positions of the slides on the members 61. Each slide 64 has a lateral projection provided with a vertical opening 67. The openings 67 shiftably and turnably receive the posts 29ª and 29ᶜ. The posts 29ª and 29ᶜ may be provided with calibrations 68 of length which may be read with raised parts 69 surrounding the upper ends of the openings 67 to determine the vertical positions of the posts. The raised parts 69 may have calibrations 70, such as vernier scales, and the post 29ª and 29ᶜ have longitudinal markers 71 which may be read with the scales 70 to determine the rotative positions of the posts. The projecting portions of the slides 64 are split to their openings 67 and clamp screws 72 pass through openings in the flanges to releasably clamp or secure the posts 29ª and 29ᶜ in the adjusted positions. From the above it will be seen that the carriage members 61 may be bodily shifted back and forth along the frame 26 and that the post carrying slides 64 may be shifted back and forth along their pairs of members 61 to bring the posts 29ª and 29ᶜ to the selected or required positions.

The posts 29ª, 29ᵇ and 29ᶜ shiftably and turnably carried by their respective carriages 27 and 28, as above described, may be simple elongate members of uniform external diameter. In practice the posts 29ª, 29ᵇ and 29ᶜ may be of the same pipe stock as the members 34 and 38 of the frame 26. The posts 29ª, 29ᵇ and 29ᶜ are straight and vertical and may be of any required or selected lengths. The posts 29ª, 29ᵇ and 29ᶜ are readily removable or disengageable from their respective carriages 27 and 28 and may be readily replaced by posts of any required lengths.

The arms 9 may be provided on any one or all of the posts 29ª, 29ᵇ and 29ᶜ to carry their respective work supporting means 30ª, 30ᵇ and 30ᶜ. The arms 9 are secured to the upper ends of the posts and are preferably adjustable to project greater or lesser distances from their posts so that the work supporting means 30ª, 30ᵇ and 30ᶜ may be positioned as required. It will be seen that the means 30ª, 30ᵇ and 30ᶜ carried on the horizontally adjustable arms 9, which in turn are carried by the rotatable and vertically adjustable posts 29ª, 29ᵇ and 29ᶜ, may be brought to any required position within the range of movement of the posts and arms.

In the particular application of the invention illustrated there is a single arm 9 provided on the post 29ᵇ, it being understood that in other uses of the fabricator that similar arms 9 may be provided on the other posts. The arm 9 is an elongate member and may be formed of pipe of the same kind as employed in the frame 26 and posts 29ª, 29ᵇ and 29ᶜ. The arm 9 is adjustably and removably secured on the upper end of its post 29ᵇ by a T 120. The leg 121 of the T which receives the upper end portion of the post 29ᵇ is split and flanged and clamp bolts 122 are arranged through its flanges so that the T may be clamped onto the post. The head of the T 120 is likewise split and flanged and slidably receives the arm 9. When the arm 9 has been slid or adjusted to its required position clamp bolts 123 on the flanged head of the T may be tightened to secure the arm in the required position. Calibrations 124 may be provided on the arm 9 to be read in conjunction with an end of the T 120 to determine the adjustment or position of the arm. It is to be understood that the T and arm assembly 120—9, just described, may be provided on any one of the posts 29ª, 29ᵇ or 29ᶜ and may be removed and installed on the posts as the conditions of operation may require.

The means 30ª, 30ᵇ and 30ᶜ are provided on the upper ends of the posts 29ª, 29ᵇ and 29ᶜ, respectively, or on the arms 9 of the posts, to receive the flanges 21 of the templet T when the fabricator is being adjusted or set and to receive and hold the end members or flanges of the work following such adjustment. The several means 30ª, 30ᵇ and 30ᶜ may be identical and corresponding reference numerals are applied to their corresponding parts.

Each means 30ª, 30ᵇ and 30ᶜ includes a fork or yoke 73 secured on the upper end of a post, see Figs. 8 and 9, or on the outer end of an arm 9, see Fig. 3. The lower ends of the yokes 73 have central sockets 74 which receive the upper ends of the posts or outer ends of the arms. The yokes 73 may be removably secured on the posts or arms and may be turnable on the posts or arms. However, where the posts 29ª, 29ᵇ and 29ᶜ and the arms 9 are themselves turnable and where the scales or calibrations 54, 70 and 124 are provided as above described the yokes may be rigidly and removably secured on their respective posts 29ª, 29ᵇ and 29ᶜ or arms 9 by clamp screws 75 engaged in keyways in the posts or arms. The arms 76 of the yokes 73 are spaced equidistant from the longitudinal axes of the respective posts 29ª, 29ᵇ and 29ᶜ or arms 9 as the case may be. Aligned horizontal openings 77 are provided in the arms 76 of the yokes 73 and slots 78 enter the upper ends of the arms to intersect or join the openings.

Adjustable work holding assemblies are mounted in the yokes 73. Each of these assemblies comprises a body or carrier 79. The carriers 79 are ring-like elements and are provided at diametrically opposite points with brackets 80. The brackets 80 carry horizontal gimbals or shafts 81 which are turnably received in the openings 77 of the yokes 76. The common axes of the shafts 81 intersect the axes of the posts 29ª, 29ᵇ and 29ᶜ or arms 9. Accordingly, the carriers 79 are supported for pivotal adjustment about horizontal axes which intersect the axes of their respective posts 29ª, 29ᵇ and 29ᶜ or arms 9. Means are provided for releasably locking or securing the carriers 79 in their adjusted positions. These means comprise clamp screws 82 engaged in the upper split portions of the yoke arms 76 and operable to clamp the split portions onto the shafts 81 to releasably lock the carriers 79 in their adjusted positions. The active faces of the carriers 79 are provided with raised or outstanding annular rims 83 at or adjacent their peripheries.

The means 30$^a$, 30$^b$ and 30$^c$ further include adjustable or turnable face plates 85. The face plates 85 are arranged against the faces of the carriers 79 and are spaced within their rims 83. Spaced equidistant openings 86 are provided in the face plates 85. The openings 86 are spaced and positioned to register with the openings or some of the openings in the templet flanges 21 and the work or unit U. The face plates 85 are rings or discs which flatly bear against the active faces of the carriers 79 and are turnable to selected rotative positions on the carriers. Means are provided for securing or locking the face plates 85 in the selected or adjusted positions. These means include flanged or stepped rings 87 cooperating with the peripheries of the face plates 85 which are correspondingly stepped. The rings 87 are received within the rims 83 of the carriers 79. Screws 88 are threaded into openings in the carriers 79 at the internal surfaces of the rims 83 and their heads cooperate with the rings 87 to clamp the rings against the face plates 85 and thus clamp the face plates onto the carriers 79 to hold them in their adjusted positions. Figs. 8 and 9 of the drawings show how the work may be bolted to the face plates 85 with its openings in registration with the openings of the adjustable plates. The face plates 85 may be turned on their carriers 79 to bring their openings 86 to the required positions and then may be set or clamped in place by means of the screws 88.

The means 30$^a$, 30$^b$ and 30$^c$ are such that the planes of the active work receiving faces of the face plates 85 lie in or intersect the planes occupied by the longitudinal axes of the posts 29$^a$, 29$^b$ and 29$^c$ or the arms 9 and intersect the pivotal axes of their respective carriers 79. As best illustrated in Fig. 9 of the drawings the carriers 79 are set back from their pivotal axes and the parts are proportioned so that the outer or active faces of the plates 85 lie in or intersect the central longitudinal planes of the posts depending upon the position or adjustment of the carrier. Accordingly, the end faces of the templet flanges 21 and the faces of the work or pipe flanges likewise lie in or intersect the central vertical axes of the posts 29$^a$, 29$^b$ and 29$^c$ and intersect the axes of pivotal adjustment of the carriers 79. With this construction the posts and arms 9 may be adjusted on the frame 26 to the selected or required positions as determined or indicated by the various calibrations and may be turned on their individual axes to the required positions as indicated or determined by the calibrations with the assurance that the faces of the templet flanges 21 or the work flanges, as the case may be, will assume the correct positions when brought against the face plates 85.

Figs. 10 and 11 illustrate an alternative form of work holding means. This form of construction may be employed on any one or all of the posts 29$^a$, 29$^b$ and 29$^c$ or arms 9. The work holding means of Figs. 10 and 11 includes a head or collar 89 having a socket 90 for receiving the end portion of a post 29$^a$, 29$^b$ or 29$^c$ or arm 9. The upper end of the collar 89 has a groove 91. The groove 91 is arcuate, being curved about a point or center spaced above the collar and lying in the axis of the post. The side walls of the groove 91 are concave or made up of outwardly convergent surfaces. An adjustable or slidable yoke 92 is carried in the groove 91. The yoke 92 is arcuate or partially annular and is shaped to conform to and slidably engage in the groove 91. The cooperation of the yoke 92 with the concave side walls of the groove 91 holds the yoke against bodily lateral displacement and bodily upward movement. In practice the yoke 92 has a curvature of more than 180°. The upper portions or arms of the yoke 92 have diametrically opposite openings 93 and are split. In this construction the collar 89 with its yoke 92 may be turnable on the post or arm 9. The rotatable connection may comprise cooperating or mating corrugations 84 on the post or arm 9 and on the wall of the socket 90. Calibrations may be provided to indicate the setting of the collar. Thus, in the case illustrated, a scale 94 is provided on the post and a pointer or marker 95 is provided on the collar 89 to cooperate with the scale. The collar 89 is split from its lower end to the lower portion of the groove 91. A bolt 96 is passed through a transverse opening in the split portion of the collar between the socket 90 and the groove 91 and is provided with a clamp nut 97. It will be seen that upon tightening the nut 97 the collar 89 will be clamped onto the post and the yoke 92 will be locked in the groove 91.

The work holding means of Figs. 10 and 11 further includes an adjustable face plate 98. The face plate 98 is concentrically positioned within the curved yoke 92. The face plate 98 resembles a flange of the work or pipe part, being a disc shaped member provided with two or more radial slots 99 arranged in an annular series and adapted to register with the openings in the templet flanges 21 and the flanges of the work or pipe unit U. Being elongate and radial the slots 99 are adapted to register with the openings in pipe flanges of different sizes. Gimbals or shafts 100 project from opposite sides of the plate 98 and are turnably received in the openings 93 of the yoke 92. Brackets 100$^a$ on the shafts 100 are secured to the face plate 93 and are inset to be flush with the surface of the plate. Thus, the face plate 98 is supported for pivotal adjustment about an axis transverse of the post or arm 9. As illustrated in Fig. 11 the face plate 98 is set back from the common axis of the shafts 100 so that its active face which receives the pipe flange lies in or intersects the central axis of the post or arm and intersects the axis of pivotal adjustment of the face plate. Accordingly, adjustment of the post to the proper position brings the face of the plate 98 to the required position regardless of the angular disposition of the plate so that the position of the work flange or pipe flange may be accurately determined. Means is provided for securing or releasably setting the face plate 98 in the adjusted position. This means includes screws 101 threaded through openings in the split upper ends of the yoke 92. The yoke 92 may be provided with a scale 92$^a$ to determine its setting.

In employing the apparatus of the invention the templet T is brought to the place of intended installation of the unit to be fabricated and is adjusted as above described to have its several flanges 21 engage with the flanges F of the pipe parts A, B and C. As previously described the templet T is universally adjustable so that its several flanges 21 may be flatly engaged against the pipe part flanges F and the flanges 21 may be turned so that their openings register with the openings O in the pipe flanges. In this connection one or all of the templet flanges 21 may be secured to their respective pipe flanges F by bolts 24 to assure the positive accurate setting of the several flanges. When the templet T has been adjusted its branches 12, 13 and 16 are locked or set and its flanges 21 are likewise set in the adjusted positions. The adjusted and set templet T is then disconnected from the pipe parts A, B and C and is removed to the fabricator.

The fabricator is adjusted and set to conform to or accurately receive the templet T. Fig. 3 of the drawings illustrates the manner in which the fabricator may be adjusted and set to carry the templet T which has been previously adjusted to conform to the spaced pipe parts A, B and C. In adjusting the fabricator the carriages 27 and 28 are adjusted on the frame 26 and the posts 29ª, 29ᵇ and 29ᶜ are adjusted vertically in their respective carriages and are turned to bring their means 30ª, 30ᵇ and 30ᶜ to the proper positions and the arms or arm 9 is shifted and turned to locate its work engaging means. It is believed that it will be apparent how the carriages 27 and 28 may be adjusted along the frame 26 and in the case of the carriages 28 transversely of the frame to bring the posts 29ª, 29ᵇ and 29ᶜ to the vertical planes required. The posts 29ª, 29ᵇ and 29ᶜ and arms 9 are easily adjusted longitudinally and are readily turned to bring their respective work carrying means 30ª, 30ᵇ and 30ᶜ to conform to or connect with the flanges 21 of the templet T. The flanges 21 of the templet T are engaged against the face plates 85 and may be coupled with the face plates by bolts 103. In this connection it will be noted that the carriers 79 may be pivoted in their yokes 73 and the face plates 85 may be turned in their carriers to bring the face plates to the desired vertical or angular position and to the required rotative positions to flatly engage with the templet flanges 21 and to have their openings 86 register with the openings O of the templet. In Fig. 3 of the drawings I have shown the flange 21 of the branch 12 engaged in or secured to the means 30ᶜ on the post 29ᶜ and have shown the flange 21 of the branch 13 engaged in the means 30ª on the post 29ª. The flange 21 on the branch part 16 of the templet is engaged with or connected in the means 30ᵇ on the arm 9. When the fabricator has been adjusted in conformance to the templet T it is set, that is, the carriages 27 and 28 are secured against movement, the posts 29ª, 29ᵇ and 29ᶜ and arm 9 are secured against movement and the means 30ª, 30ᵇ and 30ᶜ are locked or set with their face plates 85 engaged or coupled with the flanges 21 of the templet T. When this has been done the templet T is disengaged from the fabricator and removed.

With the fabricator adjusted and set as described above the pipe unit U to be connected between the pipe parts A, B and C is fabricated or assembled. In performing this assembling operation I usually prefer to first secure the end parts of the unit in the work holding means 30ª, 30ᵇ and 30ᶜ and then assemble the intervening portions or sections of the unit. For example, the unit U may have a flanged end section 110 held in the means 30ª, a similar flanged pipe part held in the means 30ᵇ and a like flanged part 111 engaged in the means 30ᶜ. The flanges of these pipe parts are flatly engaged against the face plates 85 and are turned so that their openings are brought into registration with the openings 86. In this manner the flanges of the unit U are made to occupy the same relative positions as the flanges 21 of the templet T when said templet was engaged with the pipe parts A, B and C. The flanges of the unit U are preferably temporarily secured to the face plates 85 by the bolts 103 so that the unit U may be assembled without danger of disturbing them. In the case illustrated in the drawings it will be assumed that the unit U is made up of a multiplicity of sections which are welded together to constitute the piping unit. The various operations required in this welding-together of the unit U may be easily and quickly carried out because the flanged end sections of the unit are positively held against movement in the positions where they will accurately conform to the pipe parts A, B and C. In this connection it will be noted that the entire frame 26 carrying the work supporting elements will be swung to any desired position and held there by the pins 47 so that the work is conveniently accessible to the workmen.

When the unit U has been completely assembled it is disconnected from the work holding means 30ª, 30ᵇ and 30ᶜ and is then in condition to be connected with the pipe parts A, B and C. When the unit U has been constructed in the manner described above its flanged ends or flanges are of necessity related so that they will exactly conform to the flanges F of the pipe parts A and B. Accordingly, there will be no difficulty in connecting the unit U with its pipe parts A, B and C.

In mass production operations the templet T may be a master templet and may be utilized to adjust and set a multiplicity of fabricators so that a multiplicity of the units U may be simultaneously produced. Furthermore, the fabricator may remain with its work holding parts set in accordance with the templet T and a plurality of units U may be successively assembled on the fabricator.

Having described typical preferred forms of apparatus and a typical manner of carrying out my invention, I do not wish to be limited or restricted to the specific details herein set forth, but wish to reserve to myself any variations or modifications that may appear to those skilled in the art and fall within the scope of the following claims:

Having described my invention, I claim:

1. A fabricator including a horizontally disposed frame, means pivotally supporting the frame at its ends, a carriage movable on the frame, a vertically adjustable post on the carriage, a work supporting face plate, and means for mounting the face plate on the post for adjustment about an axis transverse of the post.

2. A fabricator including a horizontally disposed frame, means engaging the frame at each end to pivotally support it on a horizontal axis, a plurality of posts, carriages for supporting the posts on the frame for movement thereon, and work supporting means on the upper ends of the posts.

3. A fabricator including a horizontally disposed frame, means engaging the end portions of the frame to pivotally support the frame on an axis parallel therewith, a plurality of posts, carriages for supporting the posts on the frame for movement thereon and for vertical adjustment, work supporting face plates, and means mounting the face plates on the posts for pivotal movement about axes transverse of the posts.

4. A fabricator including a horizontally disposed frame, means supporting the frame for movement about its longitudinal axis, a plurality of posts, carriages for supporting the posts on the frame for movement lengthwise thereof and for vertical adjustment, work supporting face plates, and means mounting the face plates on the posts for turning movement about their own axes.

5. A fabricator including a horizontally disposed elongate frame, means supporting the frame for tilting movement, carriages movable longitudinally and also transversely on the frame, posts projecting from the carriages laterally of the frame, work supporting face plates, and means mounting the face plates on the upper ends of the posts for turning movement.

6. A fabricator comprising an elongate support, one or more carriages movable longitudinally on the support, one or more carriages movable both longitudinally and transversely on the support, releasable means for holding the carriages against movement in the selected positions, posts projecting upwardly from the carriages and movable vertically with respect thereto, releasable means for holding the posts against movement, work supporting means, means for mounting the work supporting means on the upper ends of the posts for adjustment about axes transverse of the posts, and releasable means for holding the work supporting means against movement.

JOHN A. WOODS.

REFERENCES CITED

The following references are of record in the file of this patent:

UNITED STATES PATENTS

| Number | Name | Date |
|---|---|---|
| 2,324,919 | Fine et al. | July 20, 1943 |
| 1,611,305 | Ellwood, Sr. | Dec. 21, 1926 |
| 2,205,311 | Sabatello | June 18, 1940 |
| 1,891,127 | Wallis | Dec. 13, 1932 |
| 2,175,974 | Schurtz | Oct. 10, 1939 |
| 2,019,789 | Mahannah | Nov. 5, 1935 |
| 456,891 | Fish | July 28, 1891 |
| 1,192,267 | Bond | July 25, 1916 |
| 1,557,514 | Wise | Oct. 13, 1925 |
| 1,907,910 | Wahlberg | May 9, 1933 |
| 2,235,437 | Lawson | Mar. 18, 1941 |
| 2,234,906 | Wallis | Mar. 11, 1941 |
| 2,270,203 | Saunders | Jan. 13, 1942 |
| 1,756,480 | Wallis | Apr. 24, 1934 |

FOREIGN PATENTS

| Number | Country | Date |
|---|---|---|
| 347,410 | Germany | Jan. 18, 1922 |